United States Patent
Huynh-Thu et al.

(10) Patent No.: US 8,204,335 B2
(45) Date of Patent: Jun. 19, 2012

(54) METHOD AND APPARATUS FOR MEASURING BLOCKINESS IN VIDEO IMAGES

(75) Inventors: Quan Huynh-Thu, Ipswich (GB); Benjamin Pernot, Ipswich (GB)

(73) Assignee: Psytechnics Limited, Ipswich (GB)

( * ) Notice: Subject to any disclaimer, the term of this patent is extended or adjusted under 35 U.S.C. 154(b) by 652 days.

(21) Appl. No.: 12/427,185

(22) Filed: Apr. 21, 2009

(65) Prior Publication Data
US 2009/0273676 A1 Nov. 5, 2009

(30) Foreign Application Priority Data
Apr. 24, 2008 (EP) .................................... 08103717

(51) Int. Cl.
*G06K 9/40* (2006.01)
(52) U.S. Cl. ........ 382/268; 382/275; 382/192; 382/194; 382/199
(58) Field of Classification Search .............. 382/268, 382/275, 192, 194, 199
See application file for complete search history.

(56) References Cited

U.S. PATENT DOCUMENTS

| | | | | |
|---|---|---|---|---|
| 5,473,384 A | * | 12/1995 | Jayant et al. | 348/470 |
| 6,950,562 B2 | * | 9/2005 | Rouvellou | 382/264 |
| 2002/0126912 A1 | * | 9/2002 | Rouvellou | 382/268 |
| 2004/0120597 A1 | * | 6/2004 | Le Dinh | 382/261 |
| 2007/0071356 A1 | | 3/2007 | Caviedes et al. | |
| 2009/0208140 A1 | * | 8/2009 | Jayant et al. | 382/309 |

FOREIGN PATENT DOCUMENTS

GB 2347811 9/2000

OTHER PUBLICATIONS

Wu et al., *A Generalized Block-Edge Impairment Metric for Video Coding*, IEEE Signal Processing Letters, vol. 4, No. 11, Nov. 1997, pp. 317-320.
Kocovski et al., *An Adaptive Deblocking Algorithm for Low Bit-Rate Video*, ISCCP 2008, Malta, Mar. 12-14, 2008, pp. 888-893.

(Continued)

*Primary Examiner* — Wesley Tucker
*Assistant Examiner* — Mark Roz
(74) *Attorney, Agent, or Firm* — Fenwick & West LLP

(57) ABSTRACT

The present invention relates to an apparatus and method for processing images, in particular for determining the degree of blockiness in coded images. The invention comprises apparatus and methods for determining a degree of blockiness in a digital image comprising blocks each block comprising a plurality of rows and a plurality of columns of pixels each pixel having a value by performing the steps of: for each block determining an intra block measure in dependence upon the values of a set of pixels within said block; and determining said measure in dependence upon a plurality of said intra block measures corresponding to each block. Method and apparatus for generating a quality measure in dependence upon the measure of blockiness are also provided.

16 Claims, 4 Drawing Sheets

OTHER PUBLICATIONS

Xu et al., *An Adaptive De-blocking Method based on Measuring Flatness of Macroblock*, 2006 International Symposium on Intelligent Signal Processing and Communication Systems (ISPACS 2006), Dec. 2006, pp. 1-4.

Qing-Ming Yi, Min Shi, *A New Blocking Effect Reduction Method*, Proceedings of the Fifth International Conference on Machine Learning and Cybernetics, Dalian, Aug. 13-16, 2006, pp. 3865-3869.

Pan et al., *A locally adaptive algorithm for measuring blocking artifacts in images and videos*, www.sciencedirect.com, Signal Processing: Image Communication 19 (Jul. 2004), pp. 499-506.

Tan, K.T. et al., "A Multi-Metric Objective Picture-Quality Measurement Model for MPEG Video," *IEEE Transactions on Circuits and Systems for Video Technology*, Oct. 2000, pp. 1208-1213, vol. 10, No. 7.

Winkler, S. et al., "Perceptual Video Quality and Blockiness Metric for Multimedia Streaming Applications," *Proceedings of the 4th International Symposium on Wireless Personal Multimedia Communications*, Sep. 9-12, 2001, pp. 553-556, Aalborg, Denmark.

* cited by examiner

METHOD AND APPARATUS FOR MEASURING BLOCKINESS IN VIDEO IMAGES

BACKGROUND a. Field of the Invention

The present invention relates to an apparatus and method for processing images, in particular for determining the degree of blockiness in coded images.

The present invention describes a method to measure the blocking artefact in a digitally compressed still image or video signal. When a video signal is to be stored or transmitted over a telecommunications network, it is compressed using an encoding algorithm such that the encoded signal requires less storage space and can be transmitted over a reduced network bandwidth. Still images are also typically compressed for storage or transmission. The process of compression can introduce visual distortions and reduce the quality of the signal. Block distortion (also known as blocking or blockiness) is caused by image compression. It is characterized by the appearance of an underlying block structure in the image. This block structure is a common feature to all DCT (discrete cosine transform)—based video and still image compression techniques. Technically, it is often caused by coarse quantization of the spatial frequency components during the encoding process. In practice, blockiness appears when high data compression ratios are used, for example in order to transmit video content using a low bandwidth connection. Blockiness is subjectively annoying and for analysis of a perceptual quality of a decoded video signal it is helpful to identify and measure the level of blockiness in an encoded/transmitted video/image.

The main visual degradation appearing in digitally compressed image or video is caused by the coarse quantization of the transform coefficients in the compression process. Most modern image compression algorithms use a two-dimensional DCT producing a series of transform coefficients, which are then quantized. The quantization is at the origin of the visual distortion known as blocking artefact (or blockiness). A coarser quantization (larger quantization step) will usually cause stronger blockiness. Because the compression algorithm independently applies the DCT transform to blocks of M×N pixels, the compressed image will exhibit vertical and horizontal boundaries at the edges of the DCT blocks. Usual values for M and N are M=N=8 in video codecs such as MPEG-2, H.261 and H263.

b. Related Art

'Intrusive' or 'out-of-service' metrics which require comparison of a decoded signal to a reference signal such as those described in United Kingdom Patent Application No GB2347811 "Measuring blockiness in decoded video images", United States Patent Application No US2007071356 2007 "Method and apparatus for blocking artefact detection and measurement in block-coded video", "A Multi-Metric Objective Picture-Quality Measurement Model for MPEG Video", IEEE Transactions on Circuits and Systems for Video Technology, Vol. 10, NO. 7, October 2000 are of only background interest to the present invention which is focussed towards 'non-intrusive' or 'in-service' metrics as it is desirable to be able to analyse the degree of blockiness in a received decoded signal without having to compare the decoded signal to the original transmitted signal.

Stefan Winkler et al. in "Perceptual Video Quality and Blockiness Metric for Multimedia Streaming Applications" in Proc. 4th International Symposium on Wireless Personal Multimedia Communications, pp. 553-556, Aalborg, Denmark, 9-12 Sep., 2001 reviews a number of non-intrusive metrics including the Vlachos metric, the Wang-Bovik-Evans metric and the Wu-Yuen metric. All these known metrics have the common feature that values of pixels from one block are compared with values of pixels from one or more neighbouring blocks.

SUMMARY OF THE INVENTION

According to the invention there is provided a method of determining a measure of blocking artefacts in a digital image comprising blocks each block comprising a plurality of rows and a plurality of columns of pixels each pixel having a value, comprising the steps of: for each block determining an intra block measure in dependence upon the values of a set of pixels within said block; and determining said measure in dependence upon a plurality of said intra block measures corresponding to each block.

Preferably, the step of determining an intra block measure comprises the sub-steps of: determining a first set of row standard deviations each row standard deviation relating to the values of a set of pixels comprising a row; and determining said intra block measure in dependence upon said first set of row standard deviations.

Even more preferably, the step of determining said intra block measure further comprises the sub-step of: determining an average row standard deviation of said first set; and determining said intra block measure in dependence upon said average row standard deviation.

The step of determining an intra block measure may further comprise the sub-steps of: determining a second set of column standard deviations each column standard deviation relating to the values of a set of pixels comprising a column; and determining said intra block measure in dependence upon said second set of column standard deviations.

The step of determining said intra block measure may further comprise the sub-steps of: determining an average column standard deviation of said second set; and determining said intra block measure in dependence upon said average column standard deviation.

In a preferred embodiment the step of determining said intra block measure further comprises the sub-steps of: setting said intra block measure to be equal to zero; and increasing said intra block measure in dependence upon whether the average row standard deviation does not exceed a first predetermined threshold. The step of determining said intra block measure may further comprise the sub-step of: increasing said intra block measure in dependence upon whether the average column standard deviation does not exceed a second predetermined threshold.

Even more preferably the step of determining said intra block measure further comprises the sub-step of: increasing said intra block measure in dependence upon whether both the average row standard deviation does not exceed the first predetermined threshold and the average column standard deviation does not exceed the second predetermined threshold.

In the preferred embodiment, the step of determining said measure in dependence upon a plurality of said intra block measures further comprises the sub-steps of: determining a sum of said intra block measures; and determining said measure of dependence upon said sum.

The step of determining said measure in dependence upon a plurality of said intra block measures may further comprise the sub-step of: determining the measure in further dependence upon the total number of blocks comprising the digital image.

According to another aspect of the invention a blocking artefact measure as described above is used to generate an image quality measure in a method of image quality assessment and said quality measure may be stored for visual display and analysis.

A method of video signal quality assessment may comprise generating a video signal quality measure in dependence upon a plurality of image quality measures relating to a plurality of image frames and said video signal quality measure may be stored for visual display and analysis.

An apparatus, a computer program and a computer readable medium carrying a computer program for performing methods in accordance with the invention are also provided.

BRIEF DESCRIPTION OF THE DRAWINGS

Embodiments of the invention will now be described, by way of example only, with reference to the accompanying drawings, in which.

DETAILED DESCRIPTION

Figure 1:
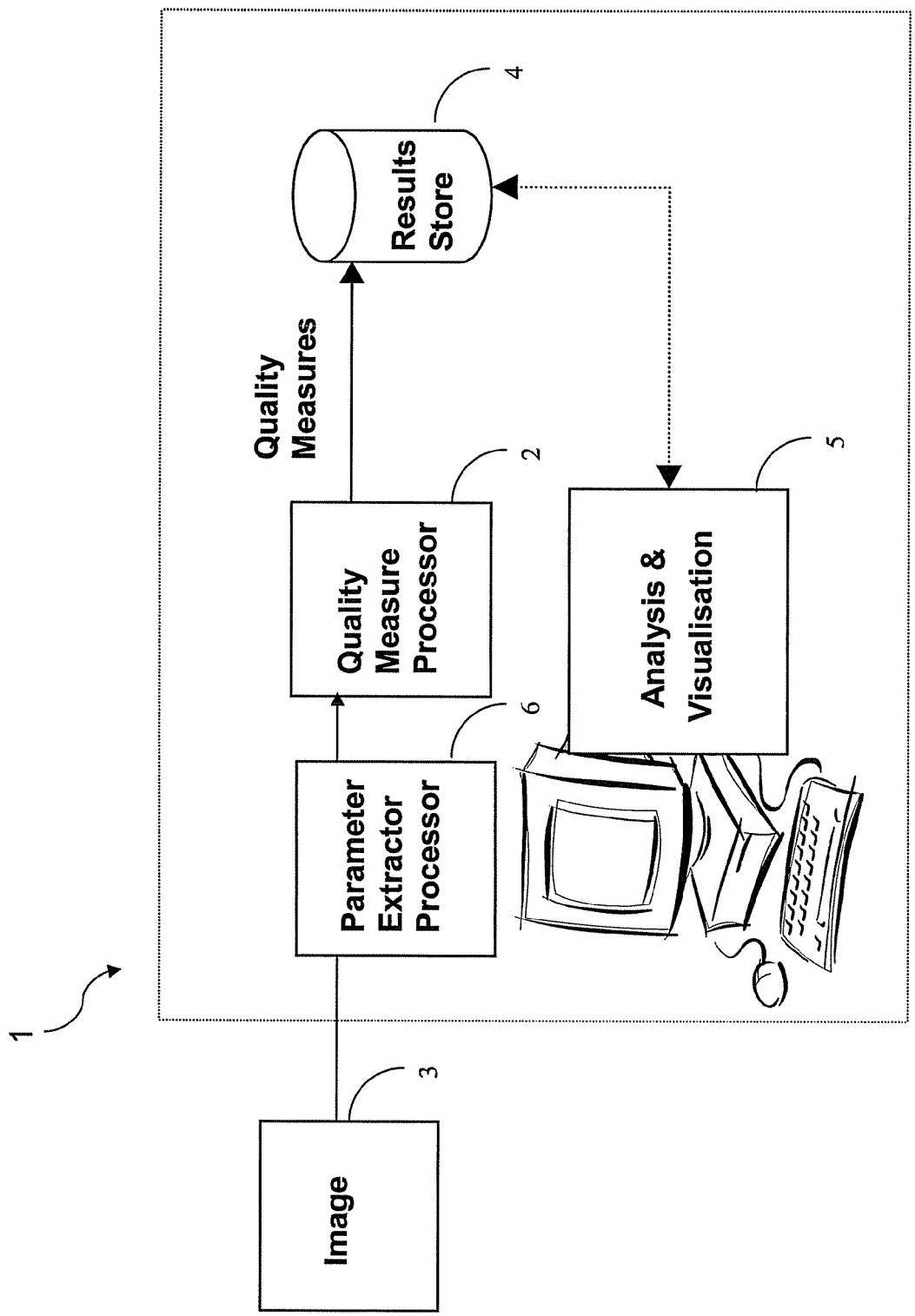
FIG. 1 is an illustration of an apparatus according to the present invention.

Referring now to FIG. 1 a system is illustrated for measuring blocking artefacts in an image and storing a measure for visualisation and analysis by a user.

A non-intrusive quality assessment system 1 is connected to receive a signal representing an image 3. The system 1 comprises a parameter extractor processor 6 arranged to extract parameters which are relevant to quality from the image 3 and a store 4 connected to receive and store quality measures. Extracted parameters are used by quality measure processor 2 (which may or may not be part of the same system as processor 6) to generate a quality measure which is then sent to analysis and visualisation module 5 (which may or may not be part of the same system as processors 2 or 6) to analyse the extracted measures of quality and to provide a user with a prediction of the perceived quality of the image.

Details relating to images which have been analysed are stored for later reference. Quality prediction models typically produce a set of intermediate parameters from the input signal (or signals in the case of a full-reference model) such that each parameter changes in response to the presence and severity of one or more classes of image impairment. Said intermediate parameters are then combined to produce a single quality prediction value that correlates with the mean opinion score (MOS) that would be obtained for the decoded input signal when assessed by human subjects in a subjective experiment. The parameter combination step can be a simple weighted sum. Methods for optimising the relative weights of the parameters, like multi-variable regression, are well known to those skilled in the art and are not directly relevant to the present invention. An example of a video quality prediction model that uses an intermediate set of parameters as described above is provided in Annex A of ITU-T Recommendation J.144, "Objective perceptual video quality measurement techniques for digital cable television in the presence of a full reference", with the weighted sum of the parameters performed according to Equation A.4-2. ITU-R Recommendation BT-500, "Methodology for the subjective assessment of the quality of television pictures" describes methods of performing subjective experiments for video signals.

A sequence of images comprising frames of a video sequence may be analysed and the quality prediction may be updated so that over a period of time the quality prediction relates to a plurality of analysed frames of data comprising a video sequence.

Figure 2:
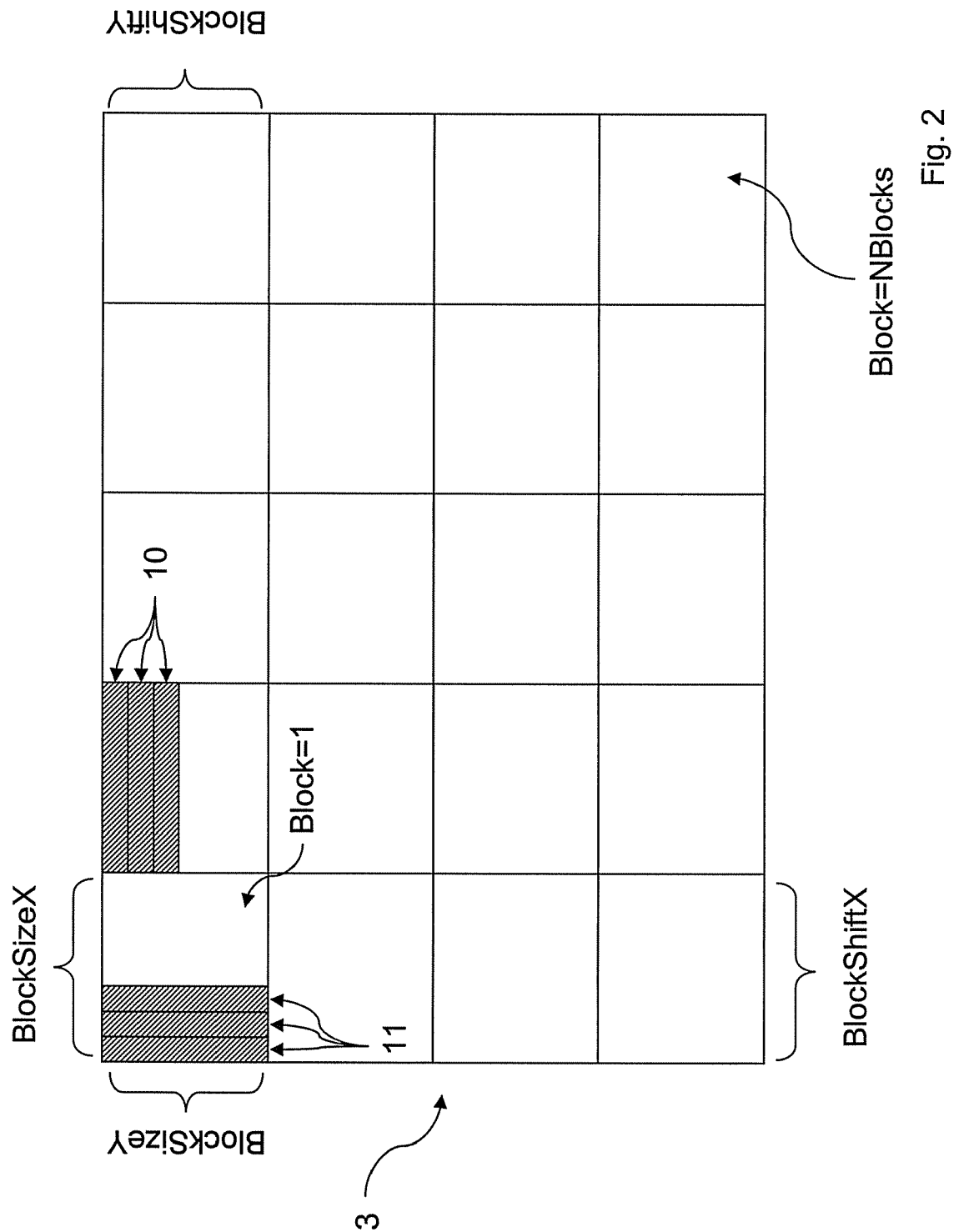
FIG. 2 is an illustration of a decoded frame of video data separated into blocks.
Figure 3:
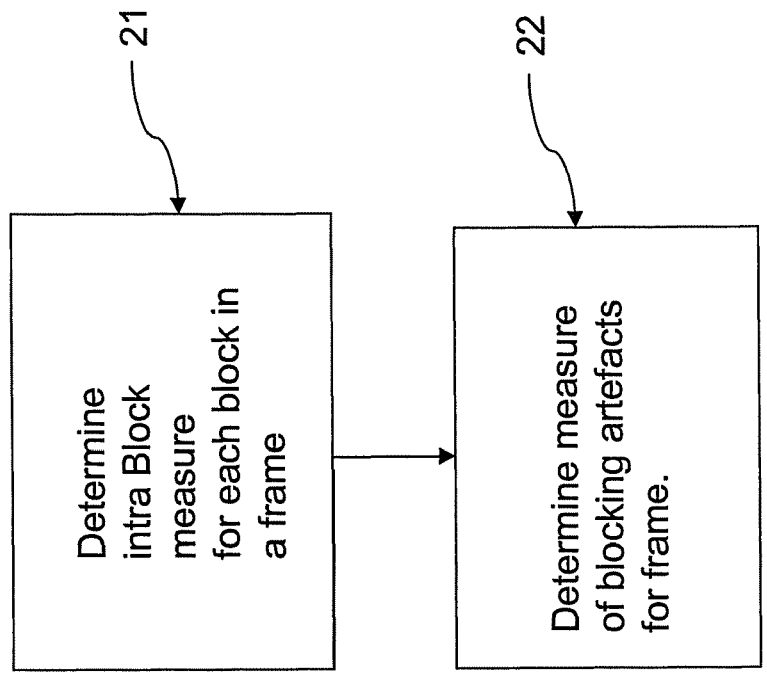
FIG. 3 is a flow chart showing an overview of the method according to the present invention.
Figure 4:
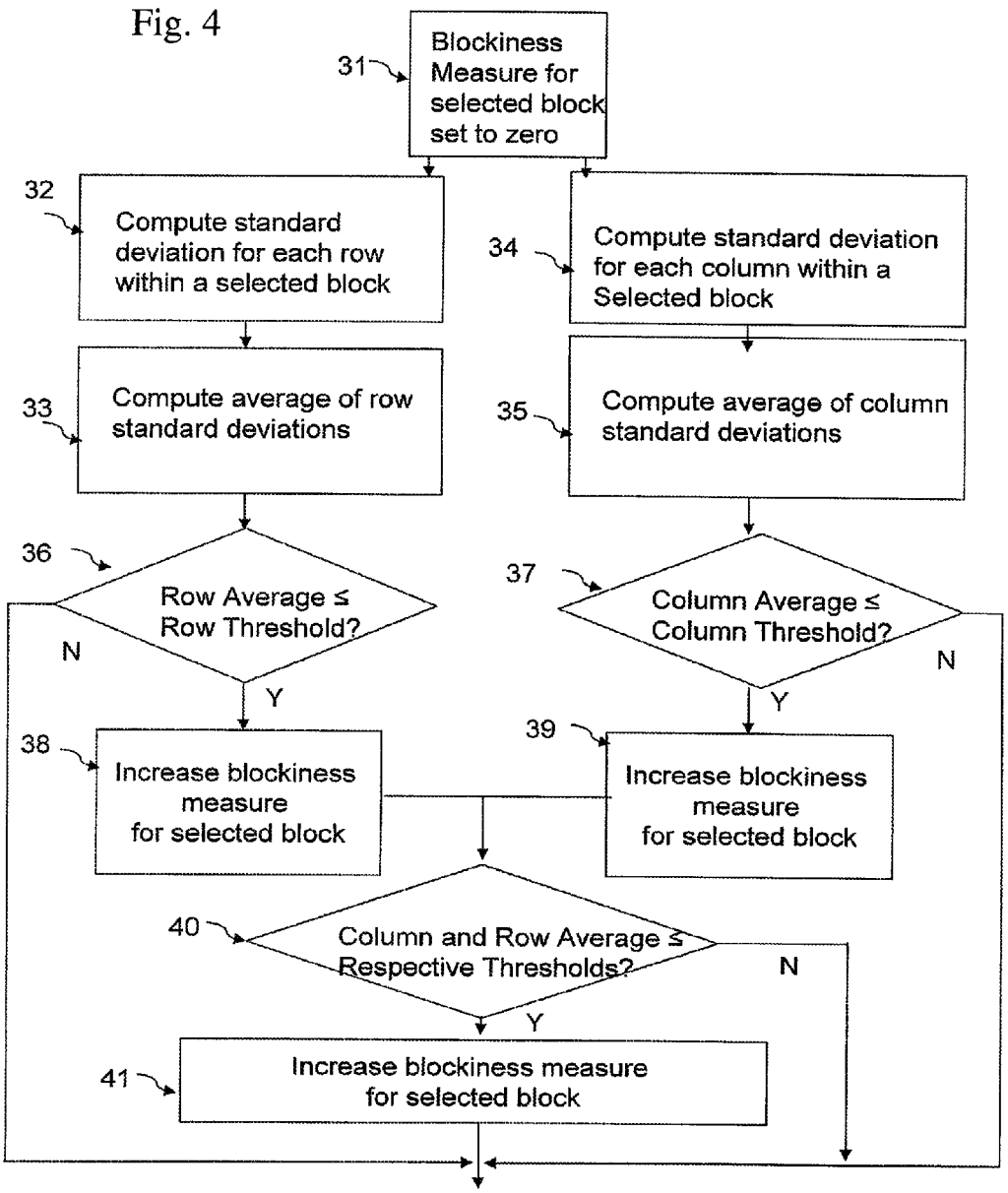
FIG. 4 is a flow chart illustrating more detailed method steps in a preferred embodiment of the present invention.

Referring now to FIGS. 2, 3 and 4 a method of determining a parameter relating to block artefact will now be described.

The measure of blockiness used in the present invention is obtained from computing the variation of pixel luminance within defined blocks of the image.

In FIG. 2, an image data frame (digital image) 3 is shown schematically decomposed into NBlocks each of size BlockSizeX×BlockSizeY separated horizontally by BlockShiftX pixels, and separated vertically by BlockShiftY pixels. FIG. 2 shows BlockSizeX equal to BlockShiftX and BlockSizeY=BlockShiftY, but it will be appreciated that this need not be the case.

The measure is based on the premise that the severity of the perceived blockiness will be proportional to the percentage of pixels within a block for which the standard deviation from the average value is small. For a video signal, this blockiness measure may be computed for each frame of data.

A method of determining an intra block measure for a selected block (k) is now described. Referring firstly to FIG. 3, an intra block measure is initially determined at step 21 for each block within the decoded image data frame 3, also referred to herein as a digital image. Then at step 22 a measure of blockiness is calculated for the frame in dependence upon the intra block measure determined for each block at step 21.

Step 21, determination of the intra block measure for each block is now described in more detail with reference to FIG. 4.

The blockiness measure for the selected block (blocking (k)) is initially set to zero at step 31. It will be appreciated that the blockiness measure may be set to zero at any point prior to its first use.

At step 32, a first set of standard deviations of a pixel value (in the preferred embodiment the value used is luminance) is determined, the set comprising a standard deviation for each row 10 within a selected block, then at step 33 an average of the first set of standard deviations is determined.

At step 34 a second set of standard deviations of a pixel value (in the preferred embodiment the value used is luminance) is determined, the set comprising a standard deviation for each column 11 within a selected block, then at step 35 the average of the second set of standard deviations is determined.

It will be appreciated that the steps involved determining each of these averages may be carried out either in order (rows and then columns or columns and then rows) or in parallel; the precise sequence of steps is not material to the invention.

Furthermore, the terms 'rows' and 'columns' are effectively interchangeable because the orientation of the digital image to be analysed is arbitrary.

In FIG. 2, the rows 10 are shown on the second block and the columns 11 are shown on the first block for clarity only, in practice, in the preferred embodiment of the invention, the first set of standard deviations and the second set of standard deviations are both calculated for each selected block.

An intra block measure is determined by increasing the measure (blocking(k)) by one at step 38 or 39 if the average of the first set of standard deviations is lower than a predetermined threshold at step 36 or if the average of the second set of standard deviations is lower than a second predetermined threshold at step 37. The measure (blocking(k)) is increased by a penalty value of one again at step 41 if both the first set of standard deviations is lower than a predetermined threshold and average of the second set of standard deviations is lower than a second predetermined threshold at step 40. In other embodiments the penalty value may be set to a value, possibly non-integer, other than one.

The blocking measure (Std2Blockiness in the equation below) is then determined in dependence upon the intra block measure for each block at step 22 (FIG. 3) according to the equation:

$$Std2Blockiness = \frac{\sum_{k=1}^{Nblocks} blocking(k)}{3 * Nblocks} * 100$$

In order to compute the blocking measure, the image is first decomposed into blocks of BlockSizeX*BlockSizeY pixels every BlockShiftX in the horizontal direction and every BlockShiftY pixels in the vertical direction. If BlockShiftX=BlockSizeX and BlockShiftY=BlockSizeY, then the blocks will be adjoining (as shown in FIG. 2). However, this is not necessary to the operation of the invention, and the complexity of the invention can be reduced by making BlockShiftX greater than BlockSizeX and BlockShiftY greater than BlockSizeY, effectively sub-sampling the image prior to analysis.

In the preferred embodiment of the invention BlockSizeX=BlockSizeY=8, BlockShiftX=BlockShiftY=32 and the predetermined threshold=0.1 in both cases.

If a blocking measure is to be calculated for the whole or portion of a video signal, then the blocking measure (Std2Blockiness) is first calculated for each frame in the video sequence and then averaged to produce a measure for the video sequence being analysed.

It will be understood by those skilled in the art that the processes described above may be implemented on a conventional programmable computer, and that a computer program encoding instructions for controlling the programmable computer to perform the above methods may be provided on a computer readable medium.

It will be appreciated that certain features of the invention, which are, for clarity, described in the context of separate embodiments, may also be provided in combination in a single embodiment. Conversely, various features of the invention which are, for brevity, described in the context of a single embodiment, may also be provided separately, or in any suitable combination.

It is to be recognised that various alterations, modifications, and/or additions may be introduced into the constructions and arrangements of parts described above without departing from the scope of the present invention as defined in the appended claims.

The invention claimed is:

1. A method of determining a measure of blocking artefacts in a digital image comprising blocks each block comprising a plurality of rows and a plurality of columns of pixels each pixel having a value, comprising the steps of:
for each block determining an intra block measure in dependence upon the values of a set of pixels within said block; and
determining said measure in dependence upon a plurality of said intra block measures corresponding to each block,
wherein the step of determining an intra block measure comprises the sub-steps of:
determining a first set of row standard deviations each row standard deviation relating to the values of a set of pixels comprising a row; and
determining said intra block measure in dependence upon said first set of row standard deviations;
wherein the step of determining said intra block measure further comprises the sub-step of:
determining an average row standard deviation of said first set; and
determining said intra block measure in dependence upon said average row standard deviation.

2. A method of determining a measure of blocking artefacts in a digital image comprising blocks each block comprising a plurality of rows and a plurality of columns of pixels each pixel having a value, comprising the steps of:
for each block determining an intra block measure in dependence upon the values of a set of pixels within said block; and
determining said measure in dependence upon a plurality of said intra block measures corresponding to each block,
wherein the step of determining an intra block measure further comprises the sub-steps of:
determining a second set of column standard deviations each column standard deviation relating to the values of a set of pixels comprising a column;
and determining said intra block measure in dependence upon said second set of column standard deviations;
wherein the step of determining said intra block measure further comprises the sub-step of:
determining an average column standard deviation of said second set; and
determining said intra block measure in dependence upon said average column standard deviation.

3. A method according to claim 1, in which the step of determining said intra block measure further comprises the sub-steps of:
setting (31) said intra block measure to be equal to zero; and
increasing (38) said intra block measure in dependence upon whether (36) the average row standard deviation does not exceed a first predetermined threshold.

4. A method according to claim 3, in which the step of determining said intra block measure further comprises the sub-step of:
increasing (39) said intra block measure in dependence upon whether (37) the average column standard deviation does not exceed a second predetermined threshold.

5. A method according to claim 4, in which the step of determining said intra block measure further comprises the sub-step of:
increasing (41) said intra block measure in dependence upon whether (40) both the average row standard deviation does not exceed the first predetermined threshold and the average column standard deviation does not exceed the second predetermined threshold.

6. A method according to claim 5, in which the step of determining said measure in dependence upon a plurality of said intra block measures further comprises the sub-steps of:
determining a sum of said intra block measures; and
determining said measure of dependence upon said sum.

7. A method according to claim 6, in which the step of determining said measure in dependence upon a plurality of said intra block measures further comprises the sub-step of:
determining the measure in further dependence upon the total number of blocks comprising the digital image.

8. A method according to claim 7, in which the pixel value is a luminance value.

9. A method of image quality assessment comprising the step of generating a quality measure in dependence upon a blocking artefact measure determined according to claim 1.

10. A method of video signal quality assessment comprising the step of generating a quality measure in dependence upon a plurality of blocking artefact measures relating to a plurality of image frames in the video signal, said blocking artefact measures being determined according claim 1.

11. A method according to claim 10 further comprising the step of storing said measure for visual display and analysis.

12. A computer readable medium carrying a computer program for implementing the method according to claim 1.

13. A computer program for implementing the method according to claim 1.

14. An apparatus for determining a measure of blocking artefacts in a digital image comprising:
   a processor for generating a quality measure;
   a store for storing said quality measure;
wherein the processor is arranged in operation to generate the quality measure in accordance with claim 9.

15. An apparatus for determining a measure of blocking artefacts in a video signal comprising:
   a processor for generating a quality measure;
   a store for storing said quality measure;
wherein the processor is arranged in operation to generate the quality measure in accordance with the method of claim 10.

16. An apparatus according to claim 14, further comprising means for analysis and visualisation of said quality measure.

* * * * *